Sept. 2, 1969   W. W. BRANNEN   3,464,526

HYDRAULIC BRAKE ADJUSTER

Filed July 23, 1968   2 Sheets-Sheet 1

INVENTOR
WILEY W. BRANNEN

BY Carl T. Mack.

ATTORNEY

Sept. 2, 1969  W. W. BRANNEN  3,464,526
HYDRAULIC BRAKE ADJUSTER
Filed July 23, 1968  2 Sheets-Sheet 2

INVENTOR
WILEY W. BRANNEN

BY *Carl T. Mack.*

ATTORNEY

United States Patent Office 3,464,526
Patented Sept. 2, 1969

3,464,526
HYDRAULIC BRAKE ADJUSTER
Wiley W. Brannen, Box 253, Statesboro, Ga. 30458
Filed July 23, 1968, Ser. No. 746,836
Int. Cl. B60t *11/24;* F16d *13/60*
U.S. Cl. 188—152                2 Claims

ABSTRACT OF THE DISCLOSURE

An auxiliary cylinder and its associated parts for use with the braking system of a vehicle. The braking fluid will be forced into the auxiliary cylinder through a line connected to the master cylinder and discharged from the auxiliary cylinder into the brake line. When the foot pedal is depressed, the piston of the master cylinder, which is similar to the piston of the auxiliary cylinder, will increase pressure of the fluid in the oil line through the auxiliary cylinder. The pressure is transmitted to the oil line by the piston of the auxiliary cylinder, and if the brakes are not worn no exchange of oil will occur between the master cylinder and the system beyond the auxiliary cylinder. Later, however, when the brake linings are worn, in order to compensate for such wear the piston in the auxiliary cylinder will be moved axially toward the discharge end of the auxiliary cylinder, whereupon with the piston unable to move further toward the discharge end of the auxiliary cylinder, fluid from the master cylinder will be forced around cup packings into the system until sufficient to compensate for the wear on the brake linings. Release of the brake pedal will permit the piston to return to its normal position, and in so doing, the cup packings will expand into contact with the inner wall of the auxiliary cylinder, confining the oil that has bypassed and consequently providing automatic brake adjustment.

BACKGROUND OF THE INVENTION

Field of the invention

This invention relates to motor vehicles having braking systems, and more particularly to the maintenance of braking systems in proper adjustment for the maximum efficiency of operation. The invention is directly concerned with braking systems which are hydraulically operated, and are actuated by means of a foot pedal for causing operation of the brakes, ordinarily one adjacent each of the four wheels of the vehicle.

After operation of the vehicle for a period of time and when the brake linings have become worn, it has been necessary to make an individual adjustment of the brake adjacent each wheel of the vehicle. Consequently, an adjustment is a time-consuming operation in which considerable difficulty is frequently experienced in obtaining and maintaining the proper adjustment and equalization of the brakes, even for a skilled mechanic to do so. Therefore, it is an object of the present invention to simplify the adjustment of hydraulically operated brakes of motor vehicles; to reduce the time required and the cost of such adjustment, as well as to improve the service and efficiency of the brakes.

Description of the prior art

Brake adjusters of various types have been used on vehicle braking systems some of which may be referred to by studying the following patents: 697,140, Goldschmidt; 1,786,231, Dick; 2,156,120, La Brie; 2,240,792, Liebreich; 2,588,955, Brannen; British Patent 365,069; British Patent 374,150.

OBJECTS OF THE INVENTION

Accordingly, it is the purpose or object of this invention to provide a new and improved hydraulic brake adjuster for use in the hydraulic braking system of a vehicle comprising a cylinder adapted to contain hydraulic brake fluid, and having inlet and exhaust ports by means of which hydraulic force can be received in and imparted from said cylinder.

A further object of the invention is to provide simple and inexpensive mechanism by means of which the superior results are obtained, and to provide mechanism which can be easily applied to brakes of vehicles already in use.

DETAILED DESCRIPTION OF THE PREFERRED EMBODIMENT

Figure 1:
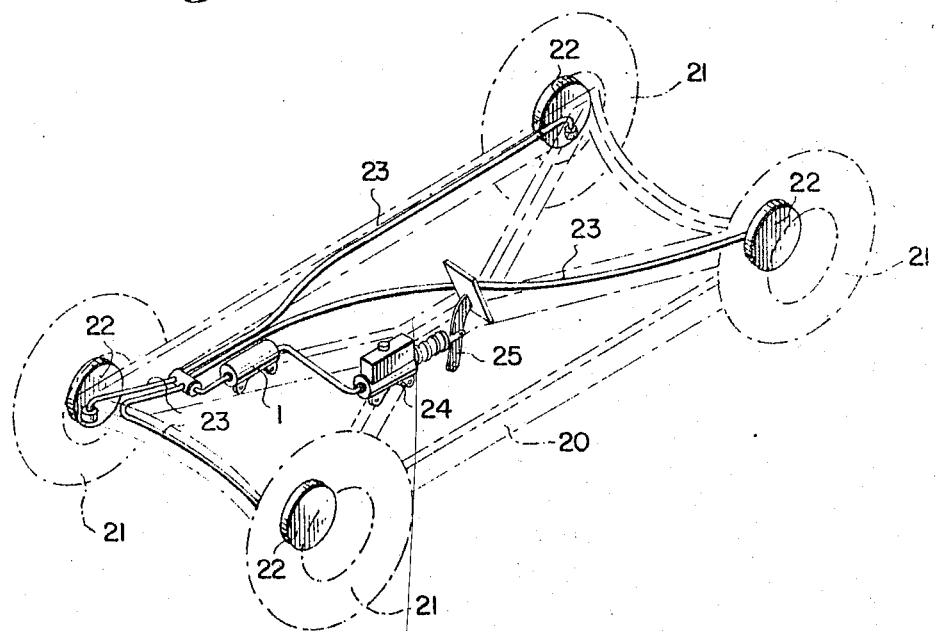
FIGURE 1 is a diagrammatic view illustrating a frame or chassis and braking system of an automobile with the present invention applied thereto.

With continued reference to the brake system, the frame or chassis 20 of an automobile is supported by wheels 21, and has brake drums 22 of which there are four in number. The brakes which operate in conjunction with the drums of each wheel are of conventional construction, and are supplied with braking fluid through conduits 23 from a master cylinder 24, the piston of which is connected to a brake pedal 25, the depression of which will actuate the brakes, the fluid pressure on each brake being equal. With the conventional brakes the hydraulic braking fluid is supplied directly from the master cylinder through the conduits or brake lines directly to the brakes in connection with the wheels of the vehicle.

The present invention relates to the addition of an auxiliary cylinder 1 whereby easy adjustment of the position of the brake pedal, and automatic adjustment of the brakes may be provided for. The auxiliary brake cylinder 1 of FIGURES 2 and 3 may be mounted in any desired manner on the chassis of the automobile as shown in FIGURE 1.

Figure 2:
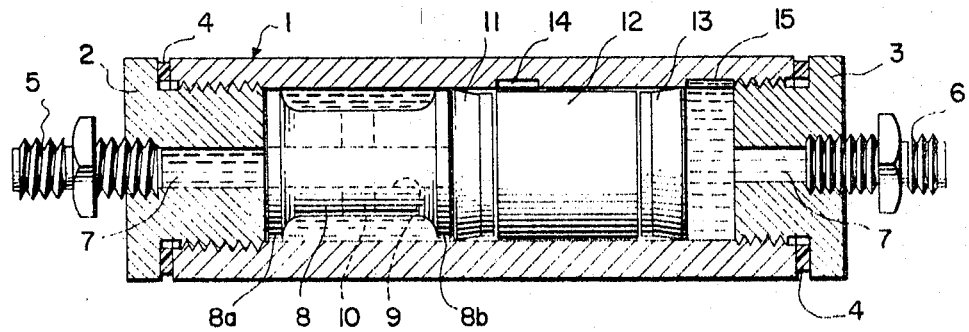
FIGURE 2 is a longitudinal section through the auxiliary braking cylinder constituting the essence of the present invention.
Figure 3:
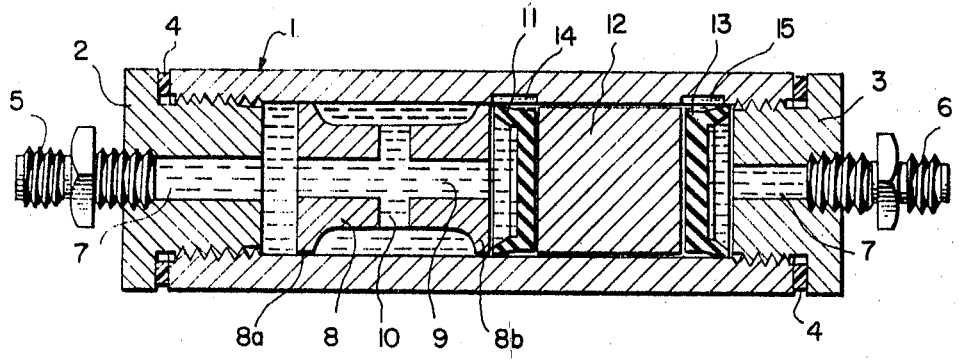
FIGURE 3 is a similar view with the parts in different positions than in FIGURE 2.
Figure 4:
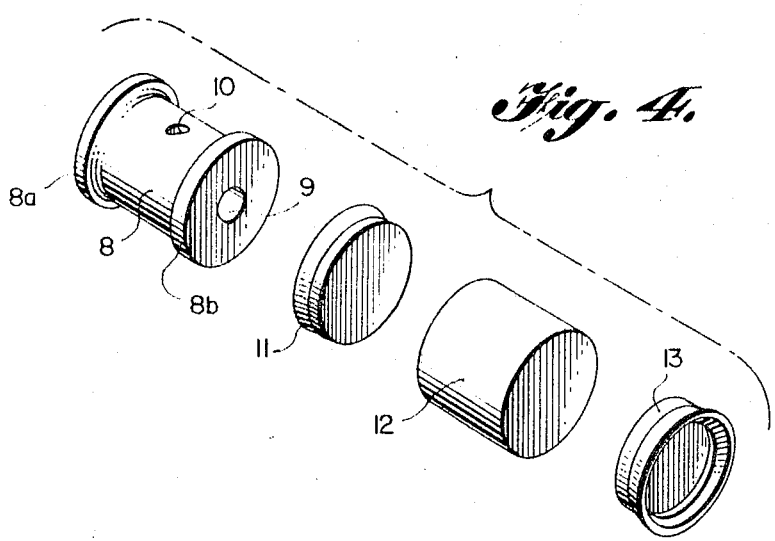
FIGURE 4 is an exploded view of the parts depicted in FIGURES 2 and 3.

As shown in FIGURES 2 and 3, plugs 2 and 3 are threaded into the respective ends of the cylinder, gaskets 4 being employed to assure tight joints. The plugs 2 and 3 are substantially identical, plug 2 being provided with an incoming fluid supply line 5 through which brake fluid may flow into the auxiliary cylinder from the master cylinder. The plug 2 is provided with a longitudinal centrally-disposed channel 7 connected with the fluid supply line 5 by threaded fittings as is well known in the art. Fluid supply line 5 is adapted to couple to or fasten to a tube forming a part of the brake line. Thus, the hydraulic brake fluid can enter the auxiliary cylinder by means of the supply line 5 and exit from the cylinder by means of the exit fluid line 6, which exit fluid line is substantially a counterpart of the fluid supply line 5, and the centrally-disposed channel 7.

Within the auxiliary cylinder 1 and in the following order are arranged several elements all of which lie upon the same longitudinal axis: A spacer element 8; a packing cup 11, the mouth of which opens toward the spacer element 8; a second spacer element 12, the external diameter of which is slightly less than the internal diameter of the auxiliary cylinder; a second packing cup 13, the solid closed bottom of which rests against the spacer element 12 and the mouth of which opens toward the exit fluid line 6. Spacer element 8 is provided with a longitudinal channel 9 and with a channel 10 disposed at a right angle to channel 9, channel 9 extending from end to end of the element 8 and channel 10 extending from side to side of spacer element 8. Spacer element 8 resembles a spool provided with flanges 8a and 8b which flanges touch but are slidably movable with respect to the wall of the cylinder. The packing cup 11 is shaped as shown in FIGURE 3 and is constructed of rubber, "neoprene," or any of the rugged plastic materials today employed in the making of packing cups. FIGURE 3 shows that the open mouth of the packing cup 11 points toward the spacer 8 and the closed bottom of the cup points toward the second spacer element 12, shaped as shown. It is a solid element, the cylindrical side wall of which does not closely fit with the interior wall of the cylinder; in other words, the cross-wise diameter is less than is the interior diameter of the cylinder, so that there is a sliding fit between the parts. Then there is a second packing cup 13 identical with packing cup 11 but the open mouth thereof points toward the exit fluid line 6.

In FIGURES 2 and 3 it is to be noted that there are two slots 14 and 15 which lie on the same longitudinal axis on the interior surface of the auxiliary cylinder. The slots are formed in the metal surface by a milling machine. Viewing FIGURE 3 it will be seen that the slots are milled just long enough to overlie the side portions of cups 11 and 13, the metal intervening between the slots being substantially equal in length to the length of the second spacer 12.

The auxiliary cylinder and its associated parts do not interfere with the normal operation of the braking system of the vehicle. The braking fluid will be forced into the auxiliary cylinder through a line which connects with fluid supply line 5 and is discharged out of the exit fluid line 6 and thence to the wheel cylinders (not shown). When the foot pedal is depressed, the piston of the master cylinder, which is similar to the piston of the auxiliary cylinder, will increase the pressure of the fluid in the fluid line by means of the auxiliary cylinder. The pressure is transmitted to the fluid line by the piston of the auxiliary cylinder and should the vehicle brakes not be worn, no exchange of the brake fluid will occur between the master cylinder and the system beyond the auxiliary cylinder. At a later time, however, when the brake linings become worn, in order to compensate for such wear, when the foot pedal is depressed, the spacers 8 and 12 together with cups 11 and 13 will move axially in the auxiliary cylinder until the elements engage the plug 3 in the discharge end of the auxiliary cylinder, whereupon with these moving parts unable to move further toward the discharge end of the auxiliary cylinder, brake fluid from the master cylinder will be forced around the cups 11 and 13, thence through the slots 14 and 15 into the system until sufficient to compensate for the wear on the brake linings. Release of the brake pedal will permit the spacers 8 and 12 to return to their normal positions and in so doing the cups 11 and 13 will expand into contact with the inner wall of the auxiliary cylinder, confining the fluid that has bypassed to the side of the cup nearest the discharge end of the auxiliary cylinder and the brake fluid lines extending therefrom to the several wheel brakes, thus providing automatic brake adjustment.

Stated in another manner, upon release of the brake pedal, the fluid pressure will be reversed by the action of the springs in the brake drums, causing the spacers 8 and 12 and packing cups to move back to their normal position, with the packing cups expanding to seal tightly against the inner cylindrical surface, thus not permitting any brake fluid to return to the master cylinder and keeping the wheel brakes in adjustment.

From the foregoing it will be readily understood that by addition of the auxiliary brake cylinder of the present invention automatic adjustment of the brakes is maintained and the position of the brake pedal is controlled.

It will also be readily apparent that the invention is relatively simple and inexpensive, and may be easily applied or removed and is much to be desired in the braking systems of motor vehicles.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. A combination brake pedal adjustment and brake adjuster for application in a hydraulic braking system of a vehicle and comprising a cylinder adapted to contain hydraulic brake fluid and having inlet and exhaust ports, the inlet port being at one end of said cylinder, the exhaust port being at the opposite end of said cylinder, by means of which hydraulic force can be received in and imparted from said cylinder to the brake drums individual to each wheel of said vehicle, said brake drums being associated with the conventional brakes and return springs individual thereto, a first spacer element in said cylinder of spool-like conformation and provided with flanges which touch but are slidably movable with respect to the inner surface of said cylinder and further provided with a longitudinal channel extending from end to end of said spacer element and with a cross-wise disposed channel extending from side to side of said spacer element and intersecting said longitudinal channel, a first packing cup adjacent to one end of said first spacer element and sealingly engaging said cylinder wall, a second spacer element whose diameter is slightly smaller than the interior diameter of said cylinder with a second packing cup adjacent thereto and disposed so that the cupped portion thereof points toward the exhaust port of said cylinder and sealingly engaging the wall of said cylinder, said auxiliary cylinder having two spaced longitudinally disposed slots milled into the inner surface of said cylinder, so that when the brake pedal of said vehicle is depressed brake fluid will enter from said master cylinder to apply hydraulic force against said first spacer element and said first and second packing cups thereby moving said first spacer element toward the exhaust port of said cylinder thereby permitting brake fluid to flow through one of said slots thence past said second spacer element, thence through another of said slots bypassing said second packing cup and thence through said exhaust port and into the hydraulic braking system.

2. A combination brake pedal adjustment and brake adjuster for application in a hydraulic braking system of a vehicle as set forth in claim 1 whereby upon release of the brake pedal the brake fluid pressure will be reversed by the springs in the individual brake drums thus causing said spacer elements and said packing cups to return to their normal position, said packing cups expanding to tightly seal against the inner surface of said cylinder, thus permitting no return of the brake fluid to said master cylinder and serving to keep the vehicle brakes in adjustment.

References Cited

UNITED STATES PATENTS 2,588,955   3/1952   Brannen.

GEORGE E. A. HALVOSA, Primary Examiner

U.S. Cl. X.R.

60—54.5; 192—111